Nov. 6, 1945. C. J. CRANE 2,388,252
SLIDE MEMBER FOR MEASURING AND MARKING DEVICES
Filed Jan. 26, 1943 2 Sheets-Sheet 1
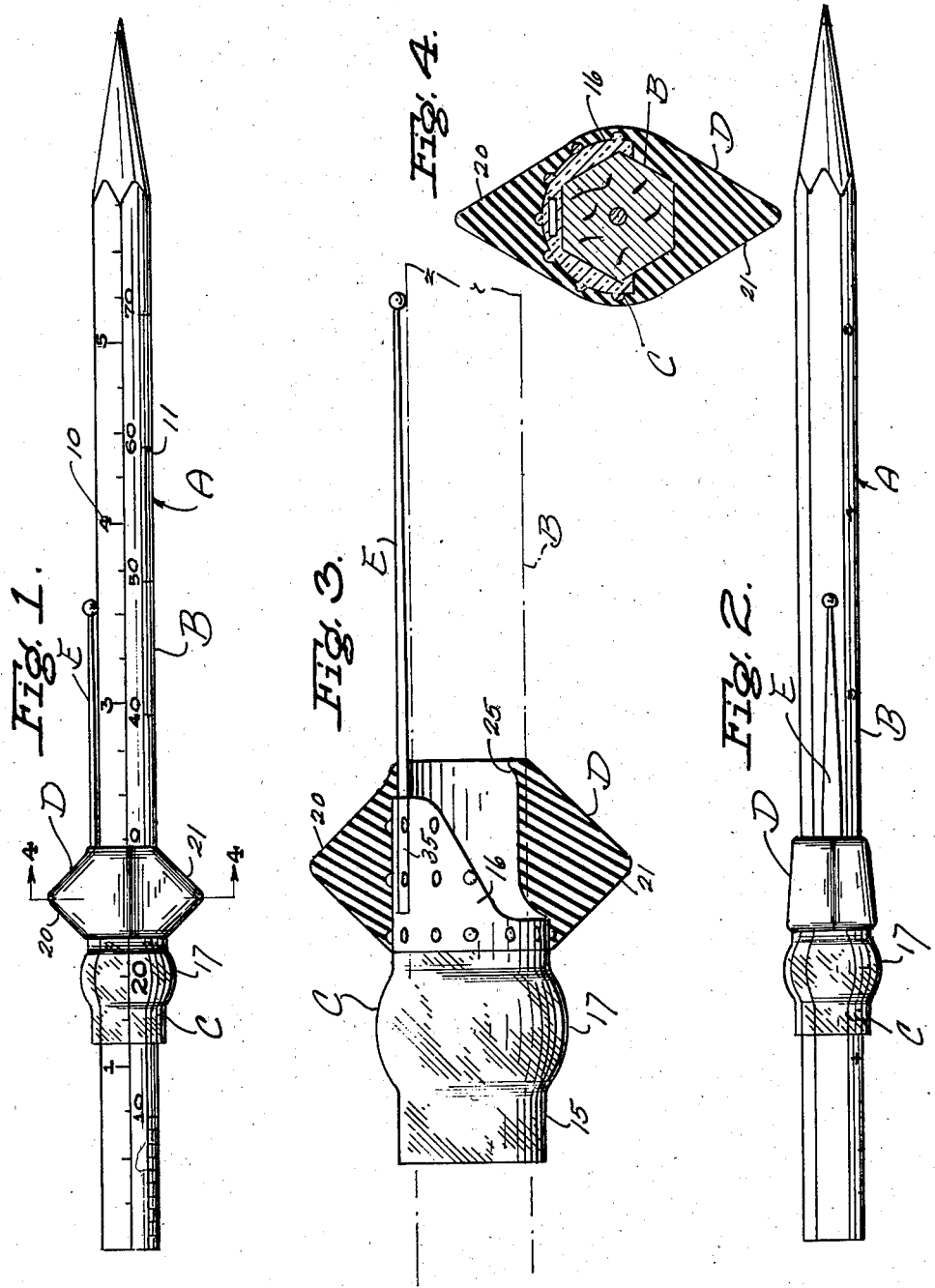
INVENTOR.
Carl J. Crane.
BY
ATTORNEYS.

Nov. 6, 1945.  C. J. CRANE  2,388,252
SLIDE MEMBER FOR MEASURING AND MARKING DEVICES
Filed Jan. 26, 1943   2 Sheets-Sheet 2
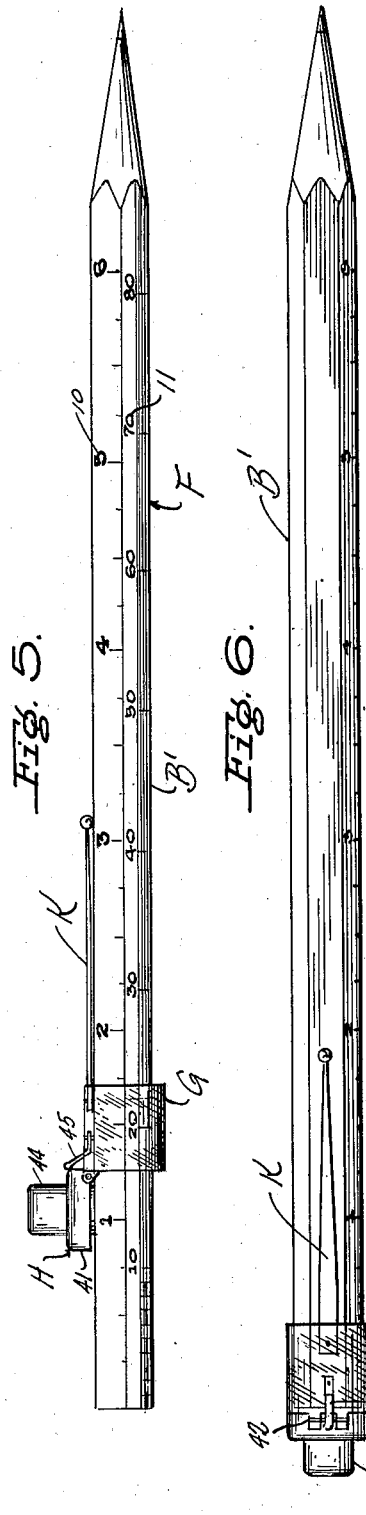
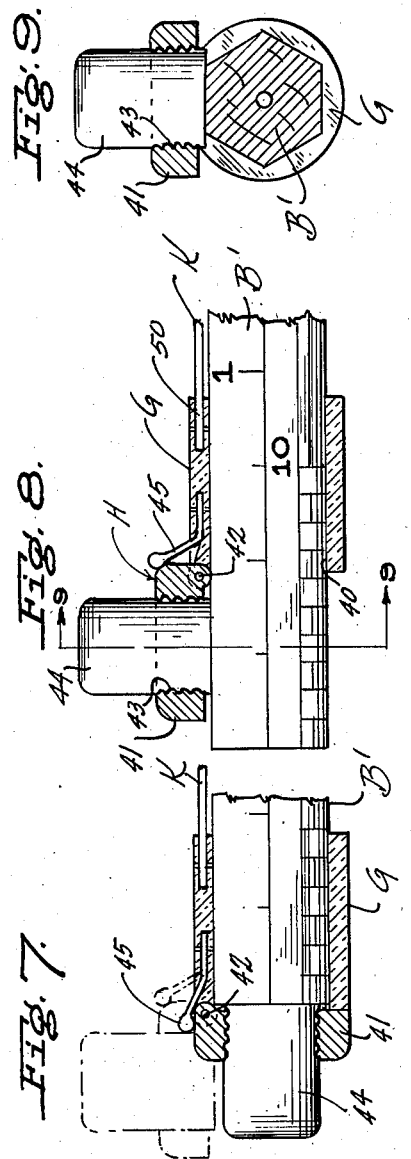
INVENTOR.
Carl J. Crane.

Patented Nov. 6, 1945

2,388,252

UNITED STATES PATENT OFFICE 2,388,252

SLIDE MEMBER FOR MEASURING AND MARKING DEVICES

Carl J. Crane, Sacramento, Calif.

Application January 26, 1943, Serial No. 473,657

15 Claims. (Cl. 33—107)

This invention relates to improvements in slide members for measuring and marking devices, such as pencils, rulers, etc. adapted to be supported in a pocket of a garment.

The primary object of this invention is the provision of a novel indicator slide in combination with a calculating scale and pencil construction.

A further object of this invention is the provision of a combination measuring pencil and indicator slide so arranged as to provide facile means for measuring map distances on various scales, etc.

A further object of this invention is the provision of an improved combination pencil and indicator slide wherein the pencil is provided with one or more scales and the slide provides an indicator or depth gauge in relation to the scales.

A further object of this invention is the provision of a pencil or other carrying medium having scales thereon and an indicator slide sleeve and with which a body of rubber is associated for the purpose of holding the slide in predetermined relation upon the pencil, the said body extending laterally of the sleeve and being additionally useful as an eraser and as a fulcrum or pivot upon which the carrying member can be supported and turned in map-scribing and scale measuring and marking operations.

Other objects and advantages of this invention will be apparent during the course of the following detailed description.

In the accompanying drawings, forming a part of this specification, and wherein similar reference characters designate corresponding parts throughout the several views, Figure 1 is a slide elevation of a pencil and slide member combined and arranged in accordance with a preferred form of the invention.

Figure 2 is a view of the pencil and slide member taken at right angles to the view of Figure 1.

Figure 3 is a side elevation of a transparent slide-sleeve and associated rubber body in section.

Figure 4 is a cross sectional view taken substantially on the line 4—4 of Figure 1.

Figure 5 is a modified form of invention showing a different construction of sleeve, clip, and rubber body associated with a scale-bearing pencil.

Figure 6 is a plan view of the combination taken at right angles to the view of Figure 5.

Figures 7 and 8 are cross sectional views showing the associated relation of the rubber body with the sleeve and pencil.

Figure 9 is a cross sectional view taken substantially on the line 9—9 of Figure 8.

In the drawings, wherein for the purpose of illustration are shown preferred and modified forms of the invention, the letter A may generally designate the preferred form of invention. It consists of pencil B and a slide assembly carried by the pencil and comprising a slide-sleeve C, a rubber body D, and a clip E. The pencil B is shown with a body or sheath of polygonal cross section but for the purposes of the invention the cross section of the pencil-body can be cylindrical or other desired shape. The pencil serves also as a medium to carry scale graduations whereby it may be used as a ruler or measuring device as well as a scribing or marking device. The scale graduations extend longitudinally of the pencil-body and may be so arranged to form one or more scales. In a multiple scale arrangement, the scales may vary in number and nature and may be disposed in related or unrelated positions with respect to each other. In the example shown, the pencil B is provided with scales 10 and 11; the scale 10 being a conventional inch-scale and the scale 11 being a map scale graduated to indicate statute miles. The transparent slide member C is intended to function as an indicator in relation to the graduations of the scale or scales and to this end each terminal edge of the sleeve is disposed in a plane normal to the axis of the sleeve and scale-bearing pencil for use as an index to register with a reading to be taken from a selected scale. When the scales are marked as shown in the drawings, the edge at the rear or left of the sleeve in Figure 1 is used as the index. In other scale arrangements, the opposite or forward edge of the sleeve may serve as an index in a manner well known to those skilled in the art. This slide member C is preferably formed of some transparent plastic, such as a synthetic resin, and includes the hollow cylindrical end portions 15 and 16, and the intermediate magnifying bulbous portion 17 thru which the delineation upon the scale or scales are viewed, as shown in Figure 1 of the drawings. The plastic sleeve C embraces the scale-bearing pencil B with a loose sliding fit and has a forward portion 16 of segmental cross section for the purpose of providing an aperture exposing a surface area of the scale-bearing pencil B in the circumferential zone of this apertured segmental portion 16, as shown in Figure 3 of the drawings, so that the body of the rubber may cooperatively grip the pencil for holding the indicator slide in a predetermined relation upon the pencil B. The rubber body D may have various shapes. In the main, the same consists of an annular portion having a passageway 25 therethru adapted to receive the pencil B and the forward segmental portion 16 of the slide C therein. Preferably, the annular portion of the rubber body is provided with diametrically opposed protuberances 20 and 21. The protuberances respectively converge to a point outwardly of the annular portion of the rubber body, as shown in Figures 3 and 4, and hence have their pointed ends respectively located a substantial distance away from the pencil and the slide. There is no objection to having these extensions annularly about the entire rubber body except that by having them in opposed relation, the pencil and slide may be more conveniently placed flat upon a map or other object for distance measuring. It will be noted from Figure 3 of the drawings that the diameter of the passageway 25 of the rubber body is less than the diameter or lineal cross distance thru the pencil B, so that the rubber body is in a deformed and strained condition when in place upon the sleeve D with the result that the portion of the elastic body which lies within the cutaway part of the slide extension 16 will be contracted into surface engagement with the pencil B and by friction will hold the rubber body and the sleeve in predetermined position upon the pencil. To further secure the rubber body D in place upon the sleeve C, the outer surface of the portion 16 of the sleeve is provided with a series of minute projections or bosses 30, which will bite into the material of the rubber body and hold the latter in position upon the sleeve. As a convenient means for supporting the slide-carrying pencil in a pocket of a garment, the retaining clip E is provided. The clip E is of a well known and conventional design and following standard practice comprises a substantially flat slender body of spring metal shaped to provide a tapered finger-like portion having a spherical knob at its smaller end and a flat rectangular portion 35 at its wider end. For purposes of the present invention, the end 35 of the clip is molded, as an insert, in the portion 16 of the sleeve C in a relation shown in Figures 3 and 4 of the drawings, with the finger-like portion of the clip extending endwise beyond the sleeve and flexed to cause the spherical end of the clip to engage the pencil. Hence, when the pencil is placed in a pocket with the outer wall of the pocket engaged between the pencil and the clip the pressure of each against the other results in the outer wall of the pocket being frictionally grasped therebetween.

In the form of invention shown in Figures 5 to 9 inclusive, designated by the letter F, the pencil B′ and the scale arrangement may be assumed of the same nature as the pencil B above described for the preferred embodiment of invention, and the same reference characters apply to the scales thereof as for the pencil B. Associated with the pencil B′ is a slide sleeve K, having an improved friction slide-stop assembly H associated therewith, and a clip K likewise associated therewith. The slide member G may be made of transparent plastic material, such as a phenolic resin, and it is provided with a passageway 40 therethru adapted to receive the scale-bearing pencil B′ with a loose sliding fit therein. The sleeve G has a terminal edge, such as the left hand edge in Figure 5, disposed in a plane normal to the axis of the sleeve and scale-bearing pencil and usable as an index in the same manner as described in connection with the corresponding edge of the sleeve C of the preferred form. The slide-stop assembly H consists of a supporting ring 41 pivoted, as at 42, upon an end of the elastic sleeve G; the said sleeve G and member 41 being provided with barrel-like projections, shown in Figures 5 and 6 of the drawings, to enable the pintle pivot 42 to be properly inserted and retained. The ring 41 is preferably of the same external diameter as the slide sleeve G, and it is provided with an internally threaded passageway 43 therethru adapted to receive a cylindrical-shaped body 44 of rubber. The body 44 threaded into the passageway 43 to the proper depth so that when the supporting ring 41 is swung laterally from the axis of the pencil to a position adjacent the side thereof as shown in Figure 8, the body 44 will have its depending lower end or base resting upon and frictionally engaging a side surface of the pencil for retaining the sleeve G and clip K in a predetermined position upon the pencil. A spring 45 is preferably molded in an end of the sleeve and engages the outer surface of the ring 41 for the purpose of normally urging the same into a position in which the ring and the rubber body carried thereby is axially aligned with the slide sleeve and pencil. This spring will also assist in maintaining engagement between the pencil and the base of the rubber body and in increasing the frictional contact between the parts engaged for holding the slide in a predetermined relation upon the pencil especially when the parts are in the position shown in Figure 8. It will be noted from Figure 7 that when the sleeve G is on the extreme end of the pencil, the spring 45 will urge the ring 41 and rubber body 44 into normal position at the end of the pencil opposite the writing end. The clip K is similar to the clip E of the preferred form of the invention and is molded, as shown at 50, into the plastic slide G and cooperates with the pencil in the same manner as described in connection with the clip E for retention of the pencil when it is pocketed.

The combination of pencil, scale, and slide thus described is advantageous in that each element of the combination functions in cooperation and coordination with the other elements to produce in various ways a desired result. Thus, the slide sleeve provides a cursor or indicator-slide for taking readings from the scale and also serves as a carrier for the clip which is positioned along the pencil or other scale-provided medium in accordance with the instant position of the slide-indicator relative to the scale. The slide-carried rubber body functions as a slide-stop which, by its frictional contact with the pencil or other scale-bearing medium, serves to yieldably maintain the slide and clip at any given setting along the scale whether the pencil is pocketed or unpocketed. In map scribing and scale measuring and marking operations, the scale-bearing pencil and associated slide assembly together provide a measuring and marking device and it will be noted that in both forms of the invention the rubber body extends laterally of the slide sleeve. Hence, the portion of the rubber body extending away from the pencil can be used as a rubber snubber or fulcrum to be pressed against the surface of the map for holding its position thereon and upon which the pencil can be turned to cause the marking point of the pencil to engage and mark the map surface, as when striking an arc thereon or when comparing radial distances from a selected central point. For example, when using the device for spacing off equal distances along a given flight line on an aeronautical chart or map, the slide is moved along the pencil until the rubber body is positioned a distance back of the pencil point corresponding to the equal distances to be marked off, which equal distances usually are not in excess of twenty-five miles each as measured from the border scale of statute miles on the map or chart. In the construction shown in Figure 1, the distance from the point of the pencil to the 4-inch scale mark on the inch scale 10 corresponds, by actual measurement, to twenty-five statute miles, approximately, on a map or chart having the scale 1:500,000. In the construction shown in Figure 5, the same amount of statute miles is represented by the distance from the point of the pencil to the half-way mark, approximately, between the 4-inch and 5-inch graduations of the inch scale. Hence, when the rubber body D, in Figure 1, is substantially centered over the 4-inch graduation of scale 10, a line drawn from the point of the pencil to the tip of either projection 20 or 21 and representing the surface of the map or chart will be at such an angle to the axis of the pencil as will permit the pencil point to touch the surface on which it is intended to make a mark. When the rubber body is thus positioned on the pencil and either projection 20 or 21 is firmly engaged with the map surface at or adjacent one end of the given flight line to serve as an anchor point or pivot for the pencil, the portion of the pencil extending rearwardly of the slide is serviceable as a handle to hold and manipulate the pencil to cause a mark or arc to be scribed on the flight line at the required distance forwardly of the pivot by the scribing point of the pencil. Each scribed mark or arc determines the new position of the fulcrum or pivot for marking or laying off the next space or distance along the flight line. The device of Figure 5 is similarly operative when the rubber body 44 is substantially centered over the half-way mark between the 4-inch and 5-inch graduations of the corresponding inch scale. Moreover, it is obvious that the dimensions of the rubber body can be changed or varied to provide that extent of use, as a snubber or fulcrum, in a range of miles or other linear measurement that may be desired. The rubber body has functional advantages in cooperation with the sleeve and scale-bearing member additional to those incident to its uses as a slide-stop and fulcrum in that the laterally projecting portion of the rubber body provides a convenient handle or finger-grip for moving the sleeve and clip along the scale. Moreover, the rubber body is so formed and associated with the slide and pencil, as shown in the drawings, that the laterally projecting portion thereof has utility as an eraser in any position of the sleeve along the pencil or scale. The scale-bearing pencil and slide assembly may be used within the limits of its scale range as a gauge for measuring heights and depths in addition to its employment as a linear scale for use with maps. When used as a gauge, the pencil is placed in parallelism with and within or against the object to be measured for height or depth with one end of the pencil at the bottom or lower extremity of the object and the other end extending beyond the top or higher extremity of the object. The indicator-sleeve preferably being in a preset position on the scale remote from the top of the object, is then shifted along the scale until its lower edge is in coincidence with or abuts the top of the object. The height or depth of the object is read at the intersection of the lower edge of the sleeve with the graduations of the scale.

Various changes in the shape, size, and arrangement of parts shown upon the forms of the invention shown herewith may be departed from within the scope of the invention and the appended claims.

I claim:

1. In a combination measuring and marking device, the combination of an elongated scribing element having a marking point at an end thereof and provided with a scale longitudinally thereof, a member slidable along the scribing element and having an index to register with the reading to be taken from the scale, and a body of rubber operatively associated with the member for movement therewith longitudinally of the scribing element with the body extending laterally of the scribing element and having a surface in frictional contact with a surface of the scribing element and having a surface portion laterally remote from the scribing element.

2. In a combination measuring and marking device, the combination of an elongated scribing element having a marking point at an end thereof and provided with a scale longitudinally thereof, a slide-sleeve movable along the scribing element and having an index to register with the reading to be taken from the scale, and a body of rubber operatively associated with the slide-sleeve for sliding movement therewith longitudinally of the scribing element with the body extending laterally of the scribing element and having a surface in frictional contact with a surface of the scribing element to resist displacement of the slide sleeve and index from a preset position relative to the scale and having a surface disposed laterally remote from the scribing element to serve as a fulcrum upon which the scribing element can be supported on a surface to be marked and upon which the said element can be turned to cause the marking point to engage and mark the surface.

3. A marking device comprising an elongated scribing element having a marking point at one end thereof, a slide mounted on the scribing element for movement longitudinally thereof and having an aperture exposing a side area of the scribing element along its path of movement, and a body of rubber operatively associated with the slide for movement therewith along the scribing element with a portion of the body frictionally contacting the side of the element through the aperture in the slide, said body extending outwardly of the slide to provide a lateral projection upon which the scribing element may be supported on a surface to be marked and on which the scribing element can be turned to cause the marking point to engage and mark the said surface.

4. A marking device comprising an elongated scribing element having a marking point at an end thereof, a slide embracing the scribing element and movable longitudinally thereof, said slide having an aperture exposing an area of the scribing element, and a body of rubber operatively associated with the slide for sliding movement therewith along the scribing element with a portion of the body extending through the said aperture into frictional contact with the exposed area of the scribing element and with another portion of the body extending outwardly of the slide to provide a lateral projection serving as an eraser and as a fulcrum upon which the said scribing element may be supported on a surface to be marked and upon which the scribing element can be turned to cause the marking point to engage and mark the surface.

5. A measuring device comprising a scale-bearing member, a sleeve on the said member having a loose fit thereon and having an index to register with the reading to be taken from a scale on the member, and a body of rubber connected with and carried by the sleeve with a portion of the body in frictional contact with the scale-bearing member for releasably holding the sleeve in a given position relative to the scale and another portion of the body extending outwardly of the sleeve and away from the scale-bearing member to provide a lateral projection thereon.

6. A measuring device comprising a scale-bearing member, a slide sleeve having a loose fit on the said member and provided with an index to register with the reading to be taken from a scale on the said member, and a body of rubber separably connected with said sleeve at an end thereof and with a base portion of the body in frictional contact with the scale-bearing member for releasably holding the sleeve in a given position relative to the scale, said body having a portion extended outwardly of the base portion to provide a lateral projection on the said sleeve.

7. A measuring device comprising a scale-bearing member, a slide sleeve of transparent plastic material embracing the scale-bearing member with a loose sliding fit thereon and provided with an index to register with a reading to be taken from a scale on the member, and a body of rubber secured to and supported by the sleeve with a portion of the rubber in frictional contact with the scale-bearing member to resist the displacement of the slide from a preset position relative to the scale-bearing member and another portion of the body extending outwardly of the sleeve and away from the member to provide a lateral projection thereon.

8. A measuring device comprising a scale-bearing member, a sleeve embracing the member and movable longitudinally thereof, said sleeve having an index to register with the reading to be taken from the scale-bearing member and also having an aperture beyond the index to expose a surface of the scale-bearing member, and a body of rubber operatively associated with the sleeve and extending laterally thereof with a part protruding inwardly through and beyond the aperture into frictional contact with the scale-bearing member and with another part extending outwardly of and beyond the aperture to form a lateral projection on the sleeve.

9. A slide for a carrying medium—such as a pencil or ruler—comprising a sleeve of plastic material having a passageway therethrough to receive the carrying medium with a loose sliding fit, and a body of rubber operatively associated with said sleeve to frictionally engage a surface of the carrying medium to retain the sleeve in a predetermined position on the carrying medium, said body having a protuberant portion extending laterally with respect to the sleeve.

10. A measuring device comprising a scale-bearing member, a transparent sleeve embracing the scale-bearing member with a loose sliding fit and having an index to register with a reading to be taken from a scale on the said member, said sleeve having a section of segmental cross section for exposing a circumferential area of the said member, and a body of rubber having an annular portion embracing the segmental section of the member and in frictional contact with the said exposed circumferential area of the member to releasably hold the sleeve in a given position on the member, said annular portion having elements thereof extending away from the scale-bearing member to provide diametrically opposed projections.

11. A measuring device comprising a scale-bearing member, a sleeve of transparent plastic material embracing the scale-bearing member with a loose sliding fit and having an annularly enlarged bulbous magnifying portion, a section of the said sleeve beyond the magnifying portion being of segmental cross section to expose a circumferential area of the scale-bearing member, an index associated with the sleeve to register with a reading to be taken from the scale-bearing member, and means releasably holding the sleeve in a given position on the scale-bearing member comprising an annular rubber body embracing the segmental section of the sleeve and in frictional contact with the said exposed area of the scale-bearing member, said body having protuberant portions extending laterally of the sleeve and respectively converging to a point at a substantial distance away from the sleeve.

12. A slide for a carrying medium—such as a pencil or ruler—comprising a sleeve of transparent plastic material provided with an annularly enlarged bulbous magnifying portion and having a passageway therethrough to receive the carrying medium with a loose sliding fit, said sleeve also having a segmental section laterally of the bulbous portion for exposing a side area of the carrying medium, and a body of rubber having an annular portion embracing the segmental section of the sleeve and contracted thereon to frictionally engage a subjacent exposed area of the carrying medium, said annular portion having an integral protuberant component thereof extending laterally with respect to the said sleeve and converging to a point at a substantial distance away from the sleeve.

13. In a measuring device, the combination of a scale-bearing member, a slide sleeve having a loose fit on the said member and provided with an index to register with a reading to be taken from a scale on the member, a ring hinged upon an end of said sleeve for movement into and out of axial alignment with the sleeve, a cylindrical body of rubber carried by the ring and having portions extending beyond the opposite faces of the ring, and spring means normally urging said ring into axial alignment with the said sleeve to maintain an extended portion of the body in frictional contact with the scale-bearing member and thereby yieldably hold the sleeve in a given position on the scale-bearing member.

14. In a measuring device, the combination of a scale-bearing member, a slide sleeve having a loose fit on the said member and provided with an index to register with a reading to be taken from a scale on the member, an internally screw-threaded ring hinged upon an end of the said sleeve for movement into and out of axial alignment with the sleeve about an axis tangent to the sleeve, a cylindrical body of rubber screwed in said ring and extending beyond opposite faces of the ring, and spring means normally urging said ring into axial alignment with the said sleeve to maintain an extended portion of the body in frictional contact with the scale-bearing member and thereby to yieldably hold the sleeve in a given position on the scale-bearing member.

15. A slide for a carrying medium—such as pencil or ruler—comprising a sleeve having a passageway therethrough to receive the carrying medium with a loose sliding fit, an internally screw-threaded ring hingedly secured to the sleeve for movement into and out of axial alignment with the said sleeve, a flat spring secured to the sleeve and engaged with th ring for urging the latter into axial alignment with the sleeve, and a cylindrical-shaped body of rubber threaded into said ring and extending above and below the ring with its extended lower portion adapted to frictionally engage a surface of the carrying medium.

CARL J. CRANE.